United States Patent Office.

CHARLES P. ALSING, OF NEW YORK, N. Y.

Letters Patent No. 77,565, dated May 5, 1868.

IMPROVED ASPHALT PAVEMENT.

The Schedule referred to in these Letters Patent and making part of the same.

---

TO ALL WHOM IT MAY CONCERN:

Be it known that I, CHARLES P. ALSING, of the city, county, and State of New York, have invented a new and improved Asphalt Pavement; and I do hereby declare that the following is a full, clear, and exact description thereof, which will enable others skilled in the art to make and use the same.

My invention has for its object to furnish an improved pavement, easily prepared and applied, which will harden almost instantly, and will be wholly unaffected by moisture or changes of temperature; and it consists of the pavement formed of the ingredients, and prepared and applied in the proportions and manner hereinafter more fully described.

In preparing the material for this pavement, I melt twenty parts of distilled coal-tar or English asphaltum and ten parts of crude coal-tar, in a suitable apparatus, at a temperature varying from fifty to one hundred degrees, according to the amount of the mass, the larger the quantity the greater being the required temperature. I then add successively ten parts of Portland or hydraulic cement, five parts of granite, crushed to the fineness of coarse sand, five parts of glass, crushed to the fineness of coarse sand, and fifty parts of coarse gravel or sand, care being taken that the sand be free from clay or earth.

The mixture is thoroughly stirred and mixed till it becomes a homogeneous mass, and the natural color of no ingredient is any longer discernible.

This mixture forms the upper layer of the pavement, and is now ready for use.

The next lower layer is formed by melting twenty parts of distilled coal-tar or English asphaltum and ten parts of crude coal-tar, and mixing therewith seventy parts of coarse gravel or sand, in the manner hereinbefore described.

The ground where the pavement is to be formed should be dry, should be levelled off, covered with a layer of coarse gravel about three inches thick, and carefully rammed. If the character of the ground renders it necessary, a wooden bottom may be laid to receive the coarse gravel, but in this case the wooden bottom should be covered with zinc-plate or a layer of well-worked cement before applying the coarse gravel.

Upon the bed thus prepared is spread a layer of the mixture last described, which layer is immediately covered with a layer of the mixture first described, the surface of which is immediately evened off or levelled and smoothed with a straight-edge.

The proportional and absolute thickness of these two layers must depend upon the purposes for which the pavement is to be used, being thinner when used exclusively for foot-passengers, and thicker, especially the lower layer, when used for horses or heavy loads.

This pavement hardens almost immediately, and after about thirty minutes is ready for use.

If desired, the pavement may be cast in blocks, and then laid in the manner of a stone or brick pavement.

Having described my invention, I claim as new, and desire to secure by Letters Patent—

An improved pavement, formed of the ingredients, and prepared and applied in substantially the proportions and manner herein described and set forth.

The above specification of my invention signed by me, this 5th day of February, 1868.

C. P. ALSING.

Witnesses:
A. W. ALNYVIST,
JAMES T. GRAHAM.